United States Patent [19]

Mizuhara

[11] Patent Number: 4,895,292

[45] Date of Patent: Jan. 23, 1990

[54] METHOD OF BRAZING TUNGSTEN CARBIDE

[75] Inventor: Howard Mizuhara, Hillsborough, Calif.

[73] Assignee: GTE Products Corporation, Stamford, Conn.

[21] Appl. No.: 370,474

[22] Filed: Jun. 23, 1989

Related U.S. Application Data

[60] Continuation-in-part of Ser. No. 262,384, Oct. 26, 1988, Pat. No. 4,853,291, which is a division of Ser. No. 174,278, Mar. 28, 1988, Pat. No. 4,839,141.

[51] Int. Cl.$^4$ .......................... B23K 1/04; B23K 35/30
[52] U.S. Cl. ................................ 228/122; 228/263.12
[58] Field of Search ............... 228/122, 263.12, 263.11

[56] References Cited

U.S. PATENT DOCUMENTS

| | | | |
|---|---|---|---|
| 388,145 | 8/1888 | Heinrich et al. | 420/587 |
| 3,072,225 | 1/1963 | Cremer et al. | 428/593 |
| 3,084,770 | 4/1963 | Wirsing Jr. | 428/593 |
| 3,663,217 | 5/1972 | Olson et al. | 228/263.15 |
| 4,527,998 | 7/1985 | Knemeyer | 420/587 |
| 4,576,790 | 3/1986 | Rothout et al. | 420/587 |
| 4,767,050 | 8/1988 | Flood et al. | 228/122 |

*Primary Examiner*—Kenneth J. Ramsey
*Attorney, Agent, or Firm*—James Theodosopoulos

[57] ABSTRACT

A filler metal for brazing tungsten carbide has a brazing temperature of 1025°–1080° C., a solidus temperature above 950° C., a liquidus temperature above 1018° C. and a composition of, in weight percent, 5–30 gold, 15–35 palladium, 10–30 nickel, 20–48 copper, 5–25 manganese.

7 Claims, No Drawings

METHOD OF BRAZING TUNGSTEN CARBIDE

This application is a continuation-in-part of Ser. No. 07/262,384, filed Oct. 26, 1988, now U.S. Pat. No. 4,853,291, which is a division of Ser. No. 174,278, filed Mar. 28, 1988 and now U.S. Pat. No. 4,839,141

This invention is concerned with a brazing alloy for brazing tungsten carbide.

A brazing alloy in accordance with this invention has the following composition, in weight percent: 5–30 gold; 15–35 palladium; 10–30 nickel; 20–48 copper; 5–25 manganese. It has a solidus temperature above about 950° C. and a liquidus temperature above about 1018° C. The alloy also has superior resistance to high temperature creep.

U.S. Pat. No. 4,527,998 discloses a brazing alloy having a composition, in weight percent, of 18–39.5 gold, 2.5–10.5 palladium, 3.5–14.5 nickel, 7.5–9 manganese, balance copper, and which is used for brazing carbides. However, the alloys disclosed therein do not have adequate resistance to high temperature creep.

Following are examples of tungsten carbide parts that were brazed to other parts in accordance with this invention. In these examples, compositions are expressed in weight percent.

EXAMPLE 1:

A 6% cobalt content cemented tungsten carbide part is brazed to a similar part using 4 mil alloy with a composition of 25% Au, 15% Pd, 18% Ni, 31% Cu, 11% Mn at 1075° C. by 10 minutes hold under $10^{-5}$ torr vacuum.

The metallograph of the polished brazed section shows excellent dense brazed layer. The SEM (Scanning Electron Metallograph) at 5000× shows the penetration of the filler metal into the cemented tungsten carbide and altering the joint mechanical property. The brazed material was subjected to 20,000 lb force or about 60,000 psi shear force without failure.

EXAMPLE 2:

Six percent cobalt cemented tungsten carbide, $\frac{1}{2}"\times\frac{1}{2}"\times\frac{1}{4}"$ was brazed to 4340 steel, $\frac{1}{2}"\times\frac{1}{2}\times 3"$ long using 4 mil foil with a composition, 15% Au, 20% Pd, 13% Ni, 41% Cu, 11% Mn. The assembly was brazed at 1075° C. by 10 minutes hold under $10^{-5}$ torr vacuum. The brazed assembly was subjected to 20,000 pound force or about 70,000 psi shear without failure. At 20,000 pound force, the 4340 steel distorted without the tungsten carbide being sheared off. The polished section showed that about 2 mil of filler metal layer remained along the cemented carbide steel interface, with most of the alloy Penetrating the 4340 steel. The alloy also showed that it attached the cemented tungsten carbide along the grain boundary and penetrated about 25 to 30 micrometers (1.2 mils).

EXAMPLE 3:

An alloy with a composition of 5% Au, 30% Pd, 12% Ni, 40% Cu, 13% Mn was cast and rolled to 2 mil foil. A 2 mil foil was placed between two cemented tungsten carbide parts, each $\frac{1}{2}"\times\frac{1}{2}"\times\frac{1}{4}"$, and vacuum brazed at 1075° C. by 10 minutes hold under $10^{-5}$ torr. An excellent strong braze was obtained that did not fail under about 60,000 psi shear loading.

EXAMPLE 4:

A 4 mil foil of 25% Au, 15% Pd, 18% Ni, 31% Cu, 11% Mn alloy was placed between $1"\times 1"\times\frac{1}{8}"$ cemented tungsten carbide and $1"\times 1"\times\frac{1}{8}"$ molybdenum, and also between molybdenum and tool steel $1"\times 1"\times\frac{1}{2}"$. The assembly was brazed at 1075° C. by 5 minutes hold under $10^{-5}$ torr vacuum. The brazed assembly was cooled to 500° C. under 2° C./minute cooling rate, and then furnace cooled. The tungsten carbide did not crack.

The low thermal expansion cemented tungsten carbide of above size brazed to high thermal expansion steel will generally crack on cooling, but by placing an interlayer material with similar thermal expansion material with much lower yield strength resulted in reducing the thermally induced stress at room temperature.

EXAMPLE 5:

Using a 4 mil thick alloy of 25% Au, 15% Pd, 18% Ni, 31% Cu, 11% Mn, a cemented tungsten carbide is brazed to 4340 steel at 1075° C. by 10 minutes hold under $10^{-5}$ torr vacuum. A 20,000 pound force or about 60,000 psi shear was applied against the brazed joint without failure.

I claim:

1. The method of joining a tungsten carbide part to another part comprising the steps of disposing a brazing alloy at the joint between the parts, the brazing alloy having a solidus temperature above and a liquidus temperature above 1018° C. and having a composition of, in weight percent, 5–30 gold, 15–35 palladium, 10–30 nickel, 20–48 copper, 5–25 manganese, and brazing the parts at a temperature of 1025°–1080° C. to form a uniform fillet at the joint.

2. The method of claim 1 wherein the brazing alloy has a composition of 25% Au, 15% Pd, 18% Ni, 31% Cu, 11% Mn.

3. The method of claim 1 wherein the brazing alloy has a composition of 5% Au, 30% Pd, 10% Ni, 40% Cu, 15% Mn.

4. The method of claim 1 wherein the brazing alloy has a composition of 15% Au, 20% Pd, 13% Ni, 41% Cu, 11% Mn.

5. The method of claim 1 wherein the other part is a tungsten carbide part.

6. The method of claim 1 wherein the other part is a steel part.

7. The method of joining a tungsten carbide part to a high expansion steel part by interposing a molybdenum interlayer therebetween, by disposing a brazing alloy in accordance with claim 1 between the tungsten carbide and the molybdenum, and by disposing another brazing alloy in accordance with claim 1 between the molybdenum and the steel, and brazing the parts at a temperature of 1025°–1080° C. to form uniform fillets at the joints.

* * * * *